United States Patent [19]

La Porta et al.

[11] Patent Number: 5,509,010
[45] Date of Patent: Apr. 16, 1996

[54] COMMUNICATIONS SIGNALING PROTOCOLS

[75] Inventors: Thomas F. La Porta, Thornwood, N.Y.; Malathi Veeraraghavan, Atlantic Highlands, N.J.

[73] Assignee: AT&T Corp., Murray Hill, N.J.

[21] Appl. No.: 82,654

[22] Filed: Jun. 25, 1993

[51] Int. Cl.$^6$ .............................. H04L 12/12; H04J 3/12
[52] U.S. Cl. ...................................... 370/68.1; 370/110.1
[58] Field of Search ........................ 370/60, 60.1, 94.1, 370/110.1, 58.1, 58.2, 58.3, 68.1; 379/220, 229, 230, 240, 165, 350, 352; 395/200.02, 200.03, 600, 700

[56] References Cited

U.S. PATENT DOCUMENTS

| | | | |
|---|---|---|---|
| 4,512,016 | 4/1985 | Fulcomer et al. | 370/110.1 |
| 4,853,955 | 8/1989 | Thorn et al. | 379/230 |
| 5,184,345 | 2/1993 | Sahni | 370/110.1 |
| 5,305,318 | 4/1994 | Ozeki et al. | 370/110.1 |
| 5,313,463 | 5/1994 | Gore et al. | 370/110.1 |

OTHER PUBLICATIONS

C. Woodworth, M. J. Karol, R. D. Gitlin, "A Flexible Broadband Packet Switch for a Multimedia Integrated Network", Proceedings International Conference on Communications, Jun. 23–26, 1991, Denver.

I. Faynberg, L. R. Gabuzda, M. P. Kaplan, M. V. Kolipakum, W. J. Rowe, A. L. Waxman, "The Support of Network Interworking and Distributed Context Switching in the IN Service Data Function Model", 2nd International Conference on Intelligence in Networks, France, Mar., 1992.

S. Minzer, "A Signaling Protocol for Complex Multimedia Services", IEEE Journal on Selected Areas in Communications, vol. 9, No. 9, Dec., 1991.

M. Fukazawa, M. Wakamoto and M. W. Kim, "Intelligent Network Call Model for Broadband ISDN", ICC 1991, pp. 964–968.

*Primary Examiner*—Wellington Chin
*Assistant Examiner*—Chau T. Nguyen
*Attorney, Agent, or Firm*—John A. Caccuro

[57] ABSTRACT

A modular suite of peer-to-peer protocols that are independent of communications network architecture supported, and the type of switching systems (packet-switched or circuit-switched), is used for a broadband and/or narrowband communications network. The protocols are comprised of client-server-oriented signaling messages that are restricted to include information and parameters associated with only one particular function of traditional call processing.

9 Claims, 5 Drawing Sheets

FIG. 4

| OPERATION | CLASS | EVENTS |
|---|---|---|
| SETUP-CALL | C | U1,C4,C15 |
| MODIFY-CALL-OR-REQUEST-INFORMATION | C | U3,C4,C15 |
| RELEASE-CALL | C | U4,C12 |
| PERFORM-NEGOTIATION | C | S1,C3 |
| INTERACT-WITH-CONNECTION-SERVER | C | S2,C9,C14 |
| CONVEY-USER-SERVER-INFORMATION | U | S4 |
| PERFORM-SERVICE-INVOCATION-COORDINATION | U | C1 |

FIG. 5

| OPERATION | CLASS | EVENTS |
|---|---|---|
| SETUP-CONNECTIONS | C | C6,CC4,CC2, |
| RELEASE-CONNECTIONS | C | C8,CC7 |
| MODIFY-EXISTING-CONNECTIONS | C | C7,P11,P8 |
| FIND-PATH | C | CC1,P1,P2 |
| CUT-THRU-CONNECTION | C | CC3,N11,N12 |
| ADD-CHANNEL-TO-CONNECTION | C | P7,N8,N2 |
| DELETE-CHANNEL-FROM-CONNECTION | C | P9,N8,N2 |
| MODIFY-QoS-or-BW | C | P10,N8,P8 |

FIG. 6

| OPERATION | CLASS | EVENTS |
|---|---|---|
| RESERVE-CHANNEL | C | PS,L1,L3 |
| COMMIT-CHANNEL | C | N5,L2 |
| MODIFY-CHANNEL | C | N1,L4 |
| DROP-CHANNEL | C | N7,L5 |
| FREE-RESERVED-CHANNELS | C | P5,L5 |
| SETUP-VCI-TRANSLATION-TABLE-ENTRY | C | N6,V1 |
| DROP-VCI-TRANSLATION-TABLE-ENTRY | C | N13,V2 |
| INFORM-NODE-OF-RECEIVE-CHANNEL | U | N4 |

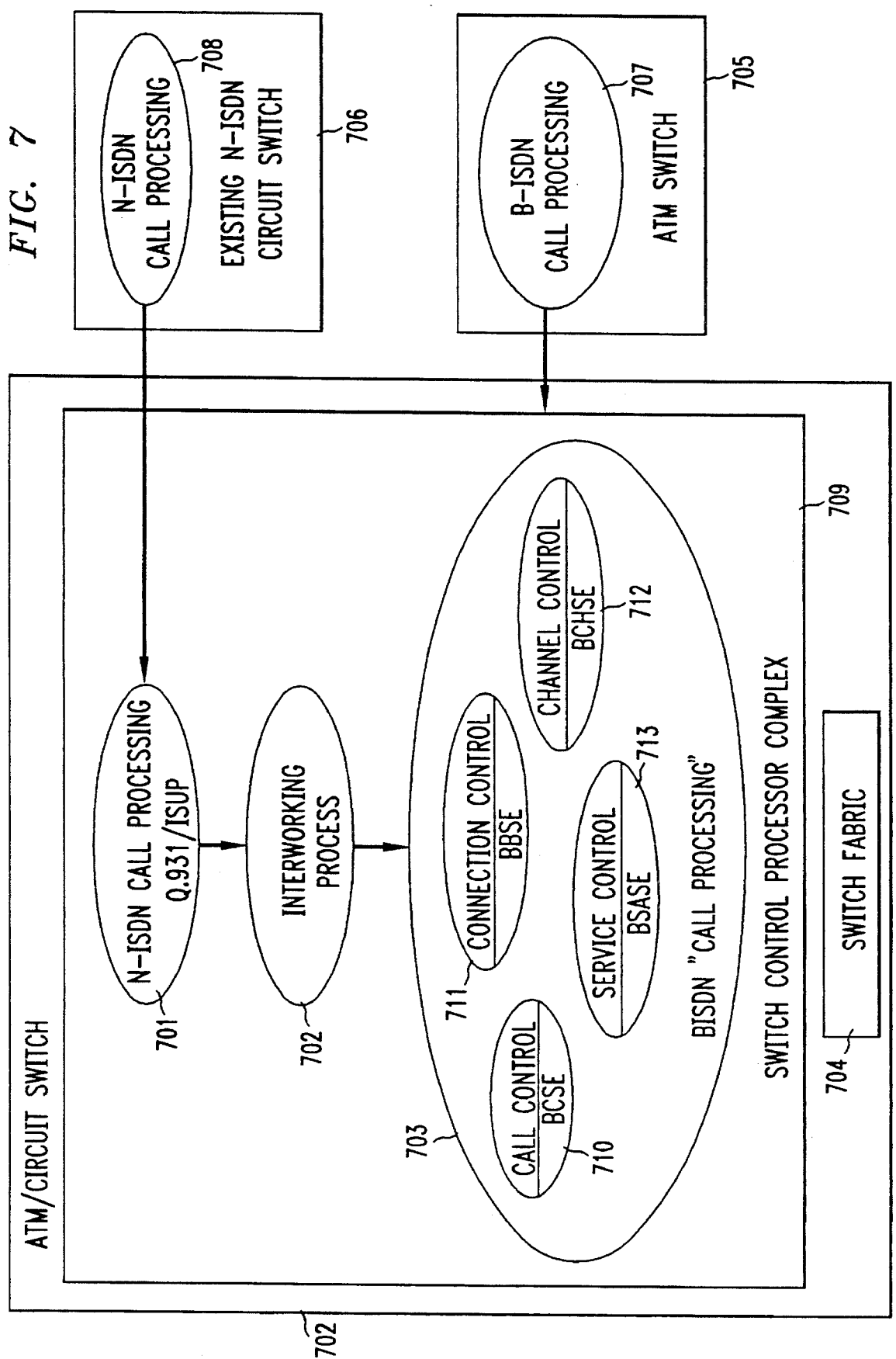

COMMUNICATIONS SIGNALING PROTOCOLS

TECHNICAL FIELD

This invention relates to communication systems. More specifically, this invention relates to signaling protocols for communications networks.

BACKGROUND

Historically, communications switches were designed to manage and perform most, if not all, the functions associated with the completion of a telephone call. These functions include switching, routing, signaling, call control and service control. The development of digital, software-driven switches, allowed the signaling function to be decoupled from the other functions performed by a switch. Accordingly, protocols governing the format and the type of signaling information, were developed to a) allow communications between switches and b) manage the interface between a switch and a signaling node handling some of the signaling functions. Thus, these interfaces were limited to strictly network-specific functions and accordingly they became known in the art as "Network Node Interfaces" (NNI). The set of standardized protocols associated with the NNI type of interfaces is the Signaling System No. 7 (SS7).

As customer premises equipment, such as Private Branch Exchanges (PBX) and telephone sets, started to use digital signals, as opposed to analog signals, to communicate with switches, protocols were also needed to manage the communications interfaces between users' equipments and switches. Accordingly, protocols were also developed to standardize user-network access procedures or, more specifically, the interfaces between the customer premises equipment and the switches of a telephone network. Those interfaces became to be known in the art as "User-Network Interfaces" (UNI). Associated with the UNI interfaces is a standardized set of protocols known as "Digital Subscriber Signaling System No. 1" (DSS1).

With the introduction of Narrowband Integrated Services Digital Network (N-ISDN) and the Open Systems Interconnection (OSI) model which defined user-network access and network-to-network (or switch-to-switch) standards for voice and data communications, UNI and NNI were adapted to conform to these new standards. NNI protocols were further extended to standardize communications procedures between switches and service-specific database systems that provide, for example, call related information look-up functions for services, such as Freephone, known in the United States as 800 Service. The subset of the NNI protocol suite related to communications between switching nodes and service-specific processors in a network is known as Transactions Capability Application Part or TCAP for short. Unfortunately, the dichotomy between user-network access procedures and switch-to-switch communications procedures remained. A consequence of that dichotomy is manifested in the need for multiple protocol conversions to take place (from UNI format to NNI format and back to UNI format) in order to relay, for example, caller-id information to the called party. More importantly, ISUP messages still include information and related parameters associated with different call processing functions, thereby unduly complicating execution of call processing functions.

With the development of Broadband Integrated Services Digital Network (B-ISDN) standards and their anticipated widespread implementation to offer a wide variety of services using, for example, Asynchronous Transfer Mode (ATM) switches, it is apparent that the existing signaling protocols are inadequate to support those new services. Extension of the existing ISDN signaling protocols to support the B-ISDN services presents certain drawbacks. Those drawbacks include a) perpetuating the distinction between user-network interfaces and network-to-node interfaces, which is likely to be dysfunctional in an environment where the roles of, and the relationship between, switches, customer premises equipment and other processors in a network can be redefined for a particular service; b) perpetuating the bundling of certain functions, such as call control, connection control, and channel control in the NNI and UNI protocol suites; and c) difficulty in managing connections, in general, and meeting quality-of-service parameter checking requirements for certain connections, in particular.

Consideration has also been given to derive new message syntax and message flow procedures for B-ISDN networks. However, that approach precludes the reuse of existing protocol-related software. Thus, no prior art signaling protocol architecture is able to provide a feasible, modular and flexible approach to allow widespread implementation of the emerging B-ISDN services while accommodating traditional and N-ISDN telephony services.

SUMMARY

One example of the present invention is directed to a modular suite of peer-to-peer protocols that are a) independent of communications network architecture, and the type of switching systems (for example, ATM or circuit-switched systems) used in the architecture b) comprised of client-server-oriented signaling messages that are restricted to include information and parameters associated with only one particular type of traditional call processing.

In a preferred embodiment of the invention, object-oriented analytical tools are used to define a set of application processes or functions associated with traditional call processing. The set of application processes or functions may include, for example, call control, connection control, channel control, and service control. Associated with each application process is an Application Service Element (ASE) which defines the operations (and related parameters) needed to be performed for an application process to communicate with another application processes. Thus, a separate set of operations is defined for each identified application process. When each application process is executed in a separate physical or logically partitioned server, the number of entities that require change to introduce a new service is greatly reduced.

Advantageously, a suite of protocols conforming to the principles of the invention may coexist with other protocols, such as ISUP. For example, the suite of protocols of the invention may be implemented for NNI interfaces only or for broadband communications exclusively, while DSS1 signaling messages are used for UNI interfaces and DSS1/SS7 protocols are used for narrowband communications.

BRIEF DESCRIPTION OF THE DRAWING

FIG. 4, 5, and 6 are tables that list the type of operations that need to be supported in a broadband communications network environment.

FIG. 7 is a networking arrangement that illustrates the potential coexistence of the signaling protocols of the invention with existing protocols.

DETAIL DESCRIPTION

Figure 1:
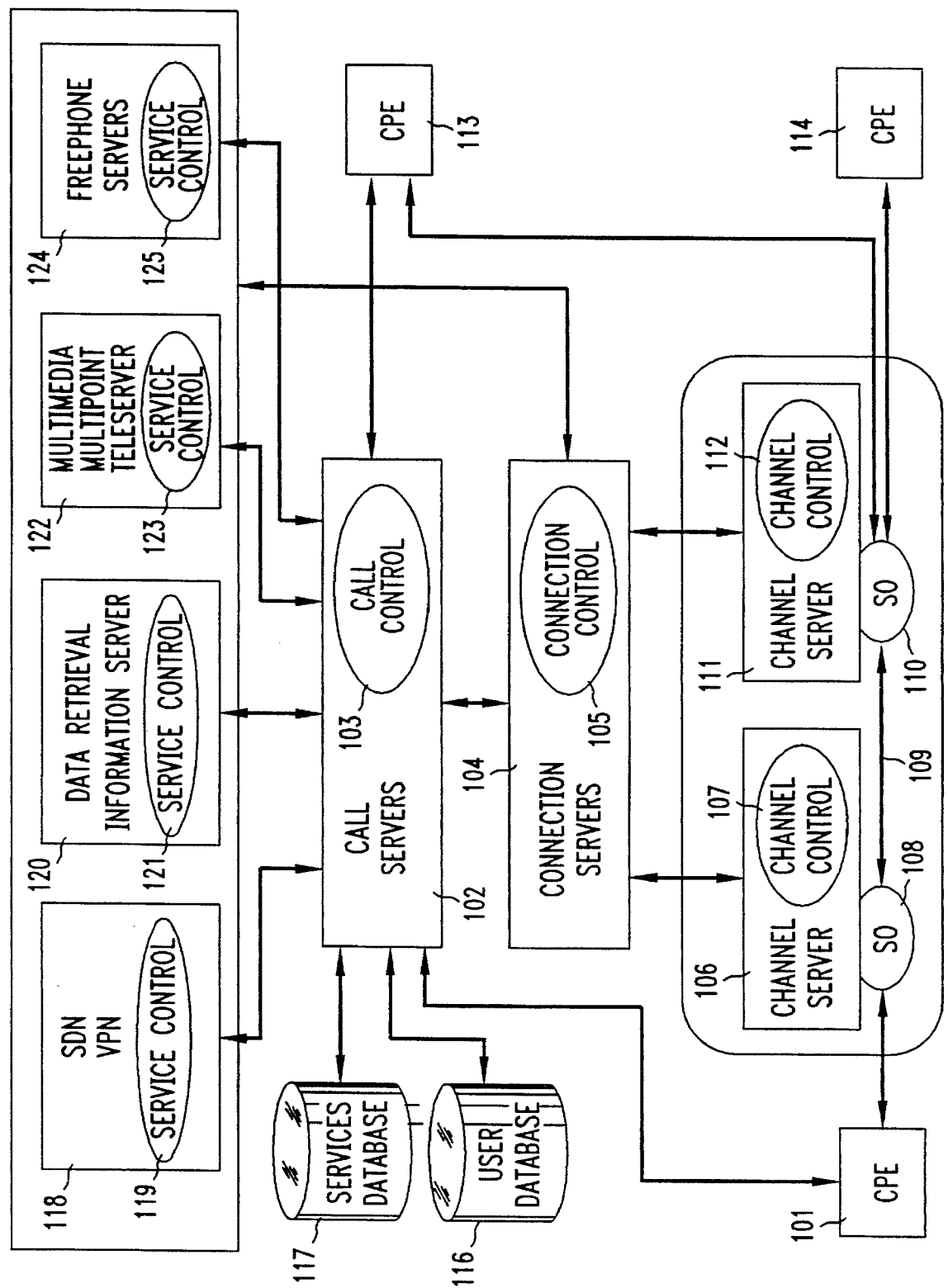
FIG. 1 is a block diagram of an exemplary distributed processing architecture for a broadband communications network.

FIG. 1 is a block diagram of an exemplary distributed processing architecture for a broadband communications network. Because of the unique requirements of broadband communications services, such as the need to support a) multiple connections in a call, b) common path/diverse path routing in a connection, c) modification of active connections, and d) end-to-end quality of service determination, certain call processing functions have been extended to manage communications over a broadband network. Those functions include call control, route control, connection control, and channel control. The identification of these functions is predicated on a formal analysis technique called Object Oriented Analysis (OOA) described in further detail below. Due to the complexity of call processing in a broadband environment, it is desirable to implement those functions in separate physical or logically partitioned servers to allow the operations of each server to be independent from the operations of another server, thereby, effectively separating service control from call control, channel control, and connection control. Thus, in FIG. 1, the call control function is shown as the call control application process 103 in call server 102. The call server is responsible for a) service coordination and invocation when multiple services are requested in a call, b) user-to-user and user-to-server negotiation of resources, c) recognition of needs for special resources, such as protocol converters and multimedia bridges, d) maintenance of call state and configuration information and e) management of ownership and permissions.

Similarly, the connection control application process 105 is implemented in connection server 104. The latter is responsible primarily for establishing, releasing and modifying connections within a call, and for computing end-to-end Quality-of-Service (QOS) measurements. Likewise, the channel control application processes 107 and 112 that are associated with Switching Offices (SO) 108 and 110, respectively, are executed in channel servers 106 and 111, respectively. Switching offices 108 and 110 house ATM switches arranged to cross-connect, multiplex and switch voice, data and video traffic. Channel servers 106 and 111 allocate resources on a link-by-link basis, and maintain Virtual Channel Identifier translation table entries (described below) to interconnect channels that are part of a connection.

Also shown in FIG. 1 are service-specific servers 118, 120, 122, and 124 that provide particular broadband-based services for a call associating users such as Customer Premises Equipment CPE 101, 113 and 114 and those servers. Further details regarding the distributed architecture of FIG. 1 can be found in the commonly assigned co-pending U.S. patent application, Ser. No. 08/055,487.

Figure 2:
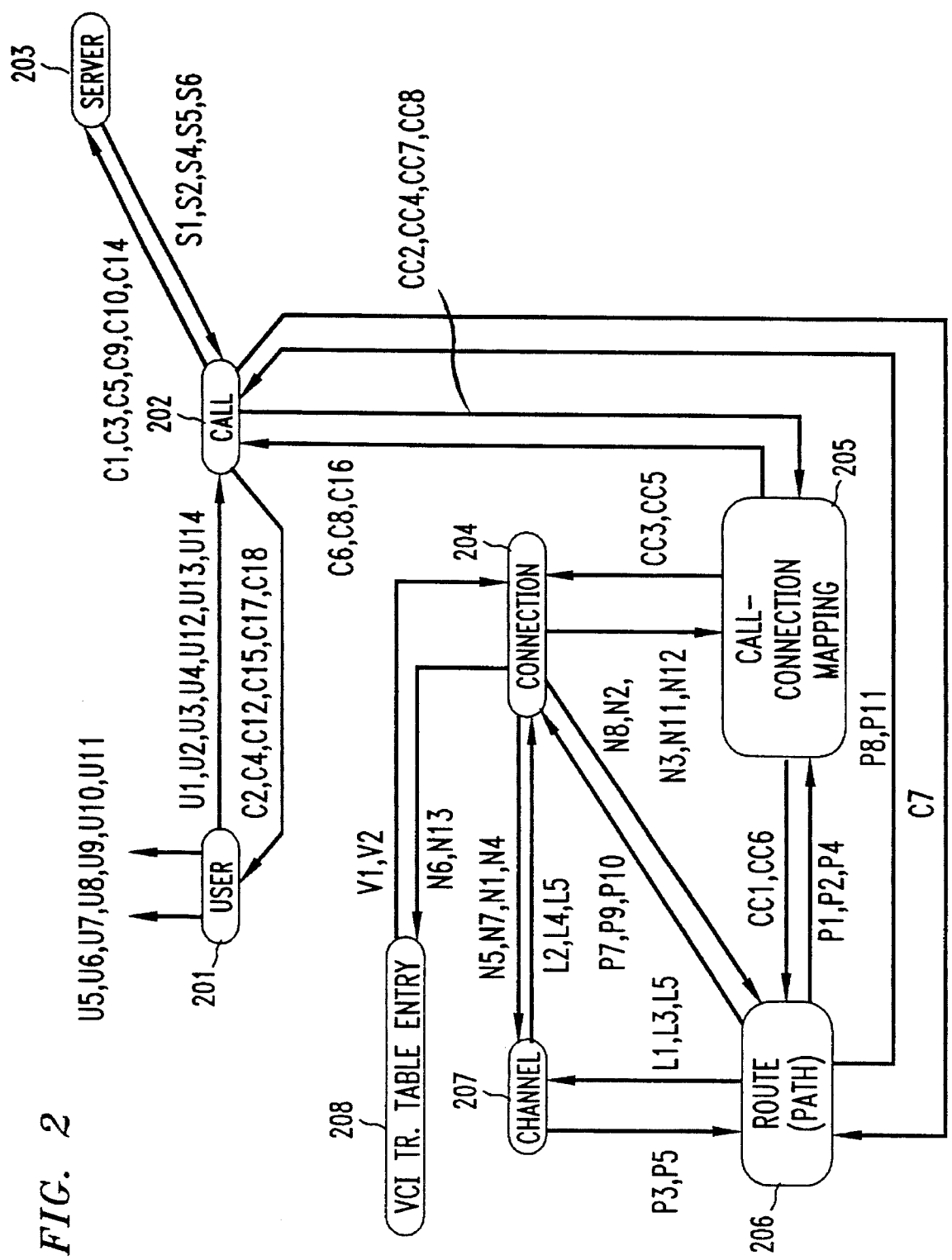
FIG. 2 is a representation of part of an Object Communications Model designed to illustrate the nature and type of inter-entity communications supported by the protocols of the invention.

FIG. 2 shows illustrative entities of a broadband communications network and the type of signaling messages needed to establish communications between these entities.

FIG. 2 is derived from the use of a four model structure advocated in a methodology called "Object Oriented Analysis" (OOA). OOA is used in this example to identify the signaling requirements of a broadband communications network. The four types of models in the OOA methodology are: Information Model (IM), State Models (SM), Object Communication Model (OCM), and Process Models (PM). The IM identifies networking entities and the characteristics of, and the relationship between, those entities that are called "objects". An object identifies all the data associated with the application domain of each entity being analyzed. Objects shown in FIG. 2 include: user object 201, call object 202, server object 203, connection object 204, call connection mapping object 205, route object 206, channel object 207 and Virtual Channel Identifier (VCI) Translation Table Entry 208.

The call object 202 defines an association between the user object 201 and the server 203. It is identified in a broadband network by a call reference value. Other attributes associated with a call object are the user objects and the server objects in the call. These attributes may be referenced by identifiers. The route object 206 is a path through the network that connects multiple end-points (users and/or servers) through switches. The route object 206 may terminate on users or servers, and may be point-to-point or multipoint. The route object 206 is referenced by a route number and entity identifiers (user, server,switches) for communications with other objects. Associated with the route object 206 are: a) performance attributes, bandwidth, and switches identifiers in the route. In the broadband model of FIG. 2, connection object 204 is a virtual channel connection (VCC). It is a communication path between users and servers through switches. The connection object 204 may identify a point-to-point or multipoint connection that extends between points where the ATM adaptation layer (AAL) is terminated. Attributes of connection object 104 are performance metrics, adaptation layer attributes, directionality, symmetry, virtual channel connection identifiers (VCCI), end user identifiers, and switches in the connection.

Because a single connection may be active on many calls, or a single call may have many active connections, the call object 202 and the connection object 204 have a many-many relationship. For this reason, the associative object called call-connection mapping object 205 is defined to map connections into calls. It is an associative object which is indicative of the many-many relationship between a call object and a communication object.

The channel object 207 defines an Asynchronous Transfer Mode (ATM) virtual channel link. It is a link in an ATM interface. The channel object 207 connects either two switches or a switch and a user/server. The channel object 207 is referenced by its Virtual Path Connection Identifier (VPCI), VCI, end entity identifiers and port numbers. VCI translation table entry 208 is an associative object that defines interconnection between channels that are pan of a connection.

In an SM (one per object identified in the IM), different states of an object instance are shown. When an object instance enters a state, it performs certain actions. As part of these actions, it generates events. Events generated in the state model of an object may cause state transitions in another object or cause transitions in its own state model. Data may be associated with an event. The OCM shows only those events generated in an object that cause transitions in another object's state model. Those events are called in the art "cross-object events". They are represented in FIG. 2 by the labels C1 to C18, CC1 to CC8, L1 to L5, N1 to N12, P1 to P10, S1 to S6, U1 to U14, and V1 to V2. A partial list of these events with their associated data are shown. In the labeling scheme, the letter "C" is used for events generated in the call object 202 and two other related objects user-call-interaction and server-call-interaction objects (not shown). The letters "CC" denote events associated with the call-connection-mapping object 205. Similarly, the letter "L" is used for events generated by channel object 207, the letter "N" is used for events generated by the connection object 204, while the "P" is used for events generated by the route (path) object 206. The letter "S" is used for server events and the letter "U" points to user events generated by user 201.

As an illustration of the relationship between objects and events, the flow of events for a successful call establishment scenario is described immediately below. The event U1 (Setup-call), is generated by the user object 201 in response to that user initiating a call requesting service provided by server 203. That event causes a state transition in the call object 202. As a result, events C1 (Invoke-server), are generated by the call object 202 which communicates events C1 to the server object instances involved in the call. The server object 203 may generate, for example, event S1 (Perform-negotiation), if needed. This causes event C2, Negotiation-with-user, to be generated from the call object 202 to the user object. The user object replies with event U2, Reply-to-negotiation-request. The call object 202 sends this response back to the requesting server object via event C3 (Return-negotiation-information-to-server). The server object 203 is then assumed, in this example, to generate event S2 (Server-request-or-response), to the call object 202. This object instance then generates event C6, (Setup-connections), to the call-connection mapping object 205. For the sake of simplicity, communications between the call-connection mapping object 205, the route object 206 and the connection object 204 are not discussed in this example. Assuming a predetermined route instance already exists, the connection object 204 generates events N5 (Commit-channel), and N6, (Setup-VCI-translation-table-entry) to the instances of channel object 207 and the VCI translation table entry object 208, respectively. Assuming success, i.e., events L2 (Channel-committed), and V 1, (VCI-translation-setup), are received by the connection object 204, the call-connection mapping object 205 generates event CC4 (Mandatory-connections-in-call-established) that is communicated to the call object 202. The latter then generates events, C4 (Notify-user-call-success) to user object instances in the call and events C9 (Notify-server-connection-success) and C5 (Notify-user-server-call-status-information) to server object instances in the call.

Similar event communication paths can be traced through FIG. 2 for call release and call modification procedures.

Based on the OCM model described in FIG. 2, the multiserver-based communications network architecture of FIG. 1 is derived. The architecture is characterized by a functional separation of the operations to be performed by the servers. For example, existing call processing functions may be allocated to individual servers as follows: fabric control functionality in channel servers 106 and 111, connection control functions in connection server 104, call control functions in the call server 202 and service control functions in the service-specific servers 118, 120, 122 and 124. Assignment of particular tasks or operations to a particular server reflects the close relationship between objects related to particular functions, as indicated by the number of cross-object events associated with those tasks or operations. For example, the call-connection mapping object 205, the connection object 204 and the route object 206 are managed in the connection server 104 of FIG. 1.

Figure 3:
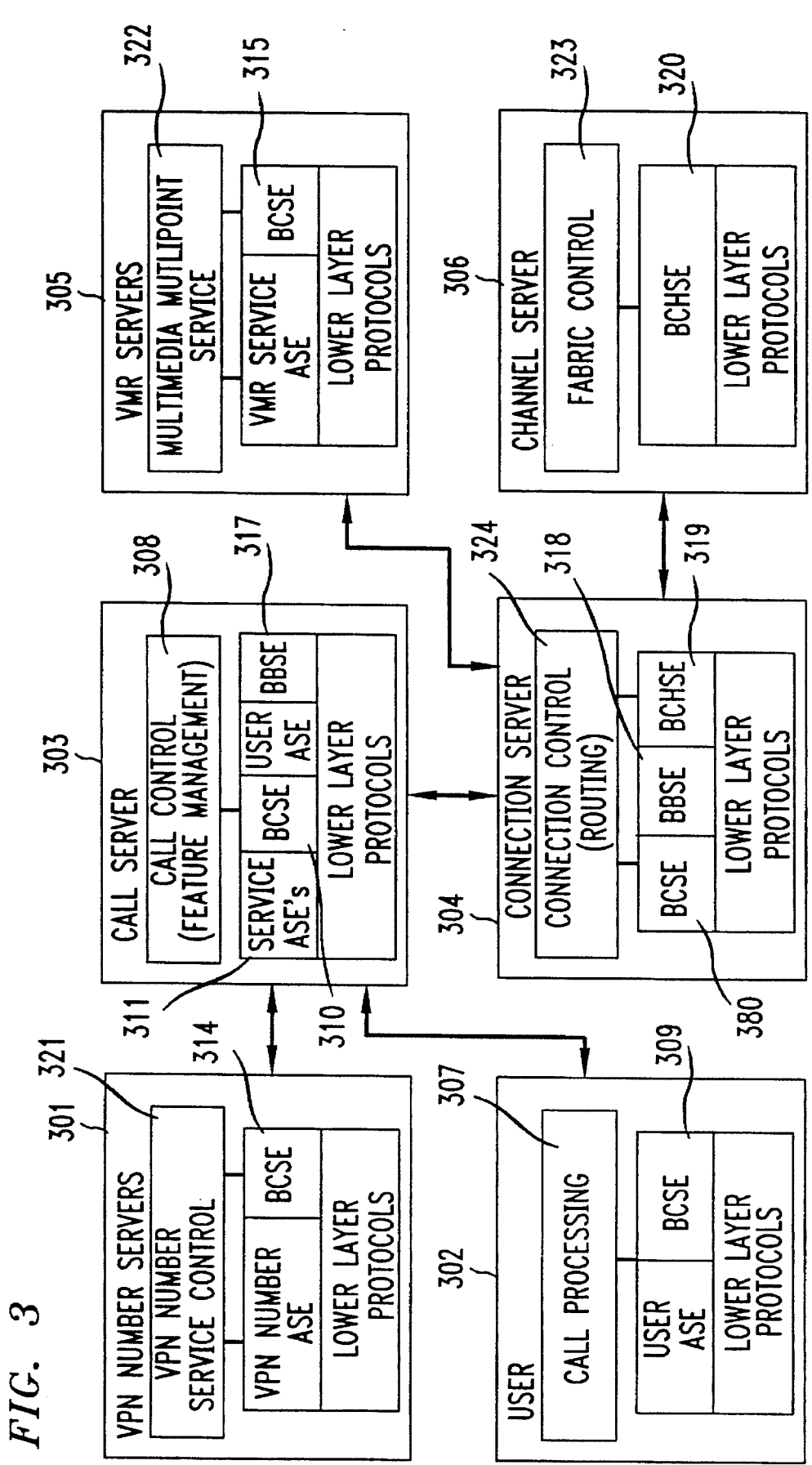
FIG. 3 shows the structure of the protocol stacks for servers implementing particular call processing functions in a broadband communications network environment.

FIG. 3 shows the structure of the protocol stacks for servers implementing particular call processing functions in a broadband communications network environment. Depicted in FIG. 3 are user 302 and servers comprising the Virtual Private Network (VPN) Server 301, the Call Server 303, the Connection Server 304, the VMR Server 305, and the Channel Server 306. Resident in each server/user is an associated application process 307, 308, 321, 322, 323, and 324. These application processes define the tasks to be performed by the user or server. For example, the Call Server 303 has an application process 308 to perform Call Control. Similarly, the Application Process 323 performs channel control functions for the channel server 306.

Also resident in each server are Application Service Elements (ASEs) which define the interfaces for communications between one or more users/servers to carry-out the task identified in the Application Process. In this example, ASEs that are defined include a) Broadband Call Service Element (BCSE) shown as BCSE 309 in user 307, BCSE 314 in the VPN server 301, BCSE 310 in call server 303, BCSE 380 in connection server 304 and BCSE 315 in VMR server 305 b) Broadband Bearer Service Element (BBSE) shown as BBSE 318 in the connection server 304 and BBSE 317 in the call server 303 c) Broadband Channel Service Element (BCHSE) shown as BCHSE 319 in connection server 304 and BCHSE 320 in channel server 306. The BCSE represents the communication functions (operations and parameters) needed to communicate with the call control application process, BBSE, the communication functions needed to reach the connection control application process, and BCHSE, the communication functions needed to reach the channel control application process.

For example, if the user 302 wishes to establish a call, it will send a request to the Call Server 303 using its BCSE 309. This request is received by the BCSE 310 in the Call Server 303, and the operation(s) and related data are forwarded to the application process performing Call Control 308 in the Call Server. If any services have been requested by the User, the Call Server will use its Service ASEs 311 to communicate with the service-specific servers. For example, the Call Server may send a request to the VPN Server 301 via its VPN ASE (a specific ASE in the set of Service ASEs 311, or it may send a request to the VMR Server 305 through the VMR service ASE (one of the 311 ASEs). The applications running in these servers 321,322 receive the requests and process them. If the Call Server requests a connection(s), it uses the BBSE 317 to access the Connection Control application 324 resident in the Connection Server 304 via its BBSE 318. Likewise, if the Connection Server Application 324 must communicate with the Channel Server Application 323 resident in the Channel Server 306, it uses its BCHSE 319 to invoke operations via the BCHSE 320 in the channel server 306.

In each server of FIG. 3 are depicted the lower layer protocols that are used for communications between servers. The nature of these protocols depends on the configuration of the servers in a networking environment. For example, servers may be colocated with switches, or may be connected with switches via signaling links. Thus, inter-server communication schemes may vary from shared memory writes to wide area protocols. Based on the network architecture, different means of involving and transporting remote operations can be used. If call control, connection control, channel control, and service control functions are implemented as different UNIX processes, standard IPC (InterProcess Communication) mechanisms can be used to support remote operation invocations. If the different application processes are distributed on servers that are physically separated, a pre-existing ASE called ROSE (Remote Operations Service Element) can be used to support remote invocations of the operations specified in the ASEs. In the UNI protocol, ROSE is used in the Q.932 Facility Information Element and in the NNI protocol, the Component Sub-Layer (CSL) of TCAP (Transaction Capabilities Application) uses ROSE. Thus, embedded bases of these protocols can be reused for transporting information related to the ASEs.

FIGS. 4, 5 and 6 provide for each ASE defined in FIG. 3, the names of operations, the classes and the corresponding cross-object events. In these figures, if an operation is confirmed (class C), a reply is expected from the other entities receiving the message. With Unconfirmed (class U) operations, no reply is expected from the entity receiving the message.

FIG. 4 shows the list of operations needed for BCSE 310, 314, 315 and 340 in FIG. 3 to support the communication needs of the call control server in FIG. 3. The first three operations in FIG. 4 correspond to events U1, U3 and U4, generated by the instance of the user object 201 in FIG. 2. These operations are invoked to reach the call control functions of establishing modifying, and releasing calls, respectively. Since Setup-call, Modify-call-or-request-information, and Release-call operations are of type Class C, events C4, (Notify-user-call-success), C15 (Notify-user-call-failure) and C12, (Call-released), indicate that success and failure responses are expected from the entity setting up the call.

Operation "Perform-negotiation", corresponds to the user-to-user and user-to-server negotiation, compatibility and status checking functions of the call control application process. In this operation, the call server (where the call control application resides) also performs its function of recognizing the need for specialized servers, such as converters. This operation corresponds to event S1 (Perform-negotiation) and event C3, (Return-negotiation-information-to-server) indicative of the fact that a response is required. The next operation, Interact-with-connection-control, corresponds to event S2, Server-request-or-response. Events C9, Notify-server-connection-success, and C14, Notify-server-connection-failure, correspond to success and failure responses, respectively.

One of the functions of call control is to act as a liaison between users and servers. The Convey-user-server-information operation in the BCSE ASE provides the communication needs of this function. The Perform-service-invocation operation may be invoked by another call server if it needs to reach servers that are connected to the remote call server.

To interact with the connection 304 of FIG. 3, the call control application process 324 in the call server 303 uses the operations of the BBSE 317 and 318 in the call server and connection server, respectively. FIG. 5 lists these operations and associated events. The operation Setup-connections is used to reach the function of connection control related to establishing connections. Operation success is reported in event CC4, (Mandatory-connection-in-call-established) and failure in event CC2 (Mandatory-connections-unavailable). Operation Release-connections is an operation whose invocation corresponds to event C8, while event CC7, (Connection-in-call-dropped) reports success. The operation Modify-existing-connections is invoked to change one ore more connections by either adding a party, dropping a party or changing QoS or bandwidth of a connection.

The operations, Find-path, and Cut-thru-connections, are used to support communication between peer connection control processes distributed among several connection servers. To support end-to-end-QoS computation, one connection server (per one or more connections in a call) may need to first accumulate QoS characteristics that can be offered for different parts of a connection, before it decides whether or not to cut-through the connections. In this case, the operation Find-path, is first invoked and reports of success or failure, events P1 and P2, collected. The connection server performs the end-to-end QoS computation and then invokes Cut-thru-connection in connection servers responsible for different segments of the connection if end-to-end QoS can be met. A similar rationale exists for operations Add-channel-to-connection, Delete-channel-from-connection and Modify-QoS-or-BW operations of BBSE.

Operations to support the communication needs of channel control BCHSE 320 are shown in FIG. 6. The Reserve-channel operation corresponds to event P3 with the same name. If a route object instance corresponding to the needs of a connection setup request does not exist, then channel object instances are first reserved. The connection control function determines whether the attributes of the requested connection can be met before committing these channels with invocations of the Commit-channel operation. If a predetermined route exists, the connection control function directly invokes the Commit-channel operation of channel control applications. Operations, Modify-channel and Drop-channel, are invoked to reach the channel control application process to change characteristics of a channel and to drop a channel, respectively.

The operation, Free-reserved-channels, is invoked to release a channel that was reserved but could not be committed due to some reason. This may happen, for example, if no predetermined route can be used for the requested connection and the connection server has to poll several channel servers to find a path. As part of this procedure, it first reserves channels by involving the Reserve-channel operations in different channel servers and then computes end-to-end QoS. Then, if a route cannot be found, the connection server must invoke the Free-reserved-channels operation in these channel servers to free the reserved but uncommitted channels.

The two operations, Setup-VCI-translation-table-entry and Drop-VCI-translation-table-entry, are used to establish and release paths through switches. Since the VCI Translation Table Entry object instances are maintained in the channel servers, these operations are offered as pan of the BCHSE.

The last operation, Inform-node-of-receive-channel, is needed because channels are unidirectional. It is used to notify channel control that a given channel object instance will be receiving information as part of a connection.

FIG. 7 is a networking arrangement that illustrates the potential coexistence of the signaling protocols of the invention with existing UNI and NNI protocols. In FIG. 7, are shown a) a switch 700 capable of handling multiple communications signaling protocol stacks including more than one network-to-network stacks and one user-to-network stack. Because of its versatility, switch 700 is able to handle traditional, N-ISDN, and B-ISDN calls. B-ISDN communications signaling messages are received and processed in B-ISDN 703. The latter is a processor that executes the application processes shown as, call control 710, connection control 711, channel control 712 and service control 713, described above. Switches 700 communicates with other ATM switches such as, ATM switch 705 through B-ISDN call processing 703 using communications signaling messages conforming to the protocols described above. Thus, the application processes of switches 700 and 705 use the common signaling protocols defined in the invention to communicate.

In switch 700, N-ISDN communications signaling messages are received and processed by the N-ISDN call processing 701. Switch 700 communicates with circuit switches, such as switch 706 via the protocols in 701 and 708. When the switch 705 has to communicate with switch 706, B-ISDN call processing 707 communicates with B-ISDN call processing 703. The latter forwards the data from the received signaling messages to interworking process 702. The latter performs certain operations on the received data and sends ISDN-related data to N-ISDN call processing 701. Examples of operations performed by interworking process 702 include protocol conversion, stripping of B-ISDN-related parameters. N-ISDN call processing 701 then generates ISUP messages which are sent to N-ISDN call processing 708.

We claim:

1. A method of communicating signaling messages for use in broadband and narrowband communications networks, said method comprising the steps of:

recognizing a plurality of operations associated with call processing functions to be performed in order for said networks to deliver communications services to one or more users;

performing said call processing functions in a plurality of servers wherein each one of said servers executes a group of said operations that are substantially related to each other so as to limit communications between said servers in the performance of said call processing functions; and exchanging signaling messages between said servers for performing said call processing functions, said signaling messages being indicative of a) particular one or more operations to be performed within at least one of said servers, and b) performance attributes of said one or more operations to be performed.

2. The invention of claim 1 wherein said performing step includes the steps of:

executing in a first server at least one group of operations associated with call control functions;

executing in a second server at least one group of operations associated with channel control functions; and executing in a third server at least one group of operations associated with connection control functions.

3. The invention of claim 2 wherein said call control functions include the operations of a) service invocation and coordination when multiple services are invoked in a call, b) user-to-user and user-to-server negotiation of resources, c) recognition of needs for special resources which include protocol converters and multimedia bridges, d) maintenance of call state and configuration information and e) management of ownership and permissions for calls.

4. The invention of claim 2 wherein said channel control functions include the operations of a) allocation of resources on a link by link basis to implement a connection, and b) maintenance of Virtual Channel Identifier translation table entries to interconnect channels that are part of a connection.

5. The invention of claim 2 wherein said connection control functions comprise the operations of a) establishing, releasing, and modifying connections within a call, and b) computing end-to-end quality-of-service measurements.

6. The method of claim 1 wherein said servers define a switching complex implementing a pre-selected protocol for exchange of said signaling messages and wherein said switching complex includes a protocol conversion server for communications with different switches and servers using different protocols for communications of signaling messages.

7. The method of claim 6 wherein said switching complex is an Asynchronous Transfer Mode switching complex and said different switches are circuit-switch-based systems implementing narrowband ISDN as a protocol for exchange of signaling messages.

8. A system for exchanging signaling messages between entities of narrowband and broadband communications networks, said system comprising means for recognizing operations associated with call processing functions to be performed for delivery of communications services to users by said networks;

means for performing said call processing functions in at least three servers, wherein each one of said servers executes a group of said operations that are substantially related to each other so as to limit signaling communications between said servers, and wherein said servers include a first server for call control functions, a second server for channel control functions, and a third server for connection control functions; and means for exchanging signaling messages between said servers to perform said call processing functions, said signaling messages being indicative of a) particular one or more operations to be performed within one of said servers, and b) performance attributes of said one or more operations to be performed.

9. The system of claim 8 wherein at least one of said servers is included in a switch which further includes:

means for communicating with at least one other switch which implements different rules for exchanging signaling data.

* * * * *